United States Patent [19]
Iwamoto et al.

[11] Patent Number: 5,504,888
[45] Date of Patent: Apr. 2, 1996

[54] FILE UPDATING SYSTEM EMPLOYING THE TEMPORARY CONNECTION AND DISCONNECTION OF BUFFER STORAGE TO EXTENDED STORAGE

[75] Inventors: Koji Iwamoto, Yokohama; Hiroshi Matsui, Kamakura, both of Japan

[73] Assignees: Hitachi, Ltd., Tokyo; Hitachi Software Engineering Co., Ltd., Yokohama, both of Japan

[21] Appl. No.: 138,105

[22] Filed: Oct. 20, 1993

[30] Foreign Application Priority Data

Oct. 23, 1992 [JP] Japan .................................. 4-285776

[51] Int. Cl.⁶ .......................... G06F 17/30; G06F 13/00
[52] U.S. Cl. .................... 395/600; 395/840; 395/876; 364/238.9; 364/239.7; 364/939.7; 364/962; 364/964.5; 364/222.82; 364/DIG. 1; 364/DIG. 2
[58] Field of Search .................................. 395/600, 650, 395/425, 11, 840, 876

[56] References Cited

U.S. PATENT DOCUMENTS

| | | |
|---|---|---|
| 4,771,375 | 9/1988 | Beglin et al. . |
| 4,949,278 | 8/1990 | Davies et al. .............................. 395/11 |
| 5,127,094 | 6/1992 | Yoshimitsu .............................. 395/400 |
| 5,150,472 | 9/1992 | Blank et al. .............................. 395/425 |
| 5,220,665 | 6/1993 | Coyle, Jr. et al. ...................... 395/650 |
| 5,237,661 | 8/1993 | Kawamura et al. ..................... 395/250 |
| 5,287,496 | 2/1994 | Chen et al. .............................. 395/600 |
| 5,317,706 | 5/1994 | Pechter .................................... 395/400 |
| 5,317,731 | 5/1994 | Dias et al. .............................. 395/600 |
| 5,325,523 | 6/1994 | Beglin et al. .......................... 395/600 |

OTHER PUBLICATIONS

Leu et al., "A Model For Concurrent Checkpointing and Recovery Using Transactions", *9th International Conference on Distributed Computing Systems*, 5–9 Jun. 1989, pp. 423–430.

Kataoka et al., "A Multiversion Concurrency Control Algorithm For Concurrent Execution of Partial Update and Bulk Retrieval Transactions", *Tenth Annual International Phoenix Conference on Computers and Communications*, 27–30 Mar. 1991, pp. 130–136.

*Primary Examiner*—Thomas G. Black
*Assistant Examiner*—Paul R. Lintz
*Attorney, Agent, or Firm*—Antonelli, Terry, Stout & Kraus

[57] ABSTRACT

An extended storage is temporarily used for the dedicated use by a batch process to eliminate the contention of resources between an online process and the batch process and attain a high speed batch process while the online process is executed without affecting the online process. The online process is executed by inputting data from a file to a main storage, and the batch process updates the data on the extended storage in parallel with the online process. Since the accessing device for the online process and the batch process are different, there is no contention of resources. When the batch process is completed, the updated data is reloaded from the extended storage to the file. During the reloading of the updated data, the online process inputs the data from the extended storage. The extended storage is shared by the reloading of the updated data and the online process, but the contention of resources does not occur because both are input processes and the extended storage is a storage device which does not includes a mechanical movement unlike a magnetic disk drive.

22 Claims, 16 Drawing Sheets

⟹ : DATA FLOW

⟹ : DATA FLOW

⟹ : DATA FLOW

⟹ : DATA FLOW

⟹ : DATA FLOW

⟹ : DATA FLOW WHEN ES2 IS FILE
--→ : DATA FLOW WHEN ES1 IS FILE

⇒ : DATA FLOW

⇒ : DATA FLOW BEFORE RECONFIGURATION
→ : DATA FLOW AFTER RECONFIGURATION

FILE UPDATING SYSTEM EMPLOYING THE TEMPORARY CONNECTION AND DISCONNECTION OF BUFFER STORAGE TO EXTENDED STORAGE

BACKGROUND OF THE INVENTION

1. Field of the Invention

The present invention generally relates to an information management system for updating a file, and more particularly to an online database system in which a large amount of updating occur due to a batch process during the reference to data in an online process.

2. Description of the Related Art

In a prior art online database system, when a batch process which accompanies a large volume of updating during the online process is to be executed, a wait status due to an exclusive control of records or a busy device such as a busy disk is incurred, which affects to a performance of the online process. Accordingly, the online process is stopped at night or during holidays to conduct the batch process. As applications of the batch system, charging systems for electricity, gas, water and telephone utilities have been known. In moving toward the internationalization and total systemization of such utility systems, the 24-hour continuous operation of the online process has rapidly been developed and any chance to stop the online process is being lost. JP-A-3-266046 discloses a method for rapidly accessing a database by duplicating files and alternately switching a reference file and an updating file.

Such a prior art method has the following problems.

The contention between the reference and the updating of the file is eliminated but the execution of the batch process for updating a large volume of data takes a long time because the updating rate remains unchanged.

In addition, because of the data copy process from the updating file to the reference file, the total number of times of input and output of the files is approximately twice as large as that of the ordinary batch process. Further, during the copy process from the updating file to the reference file, there is a high possibility that a device (for example, a disk) for the reference file is busy and a wait status is incurred in the online process of the reference file so that a response time of the online process is deteriorated. A data management system which has a file for storing copies of pages of a file such as a database and extended storage (ES) and when a user application program is to access the file, is first read from the ES and an updated page is output to the ES together with the file is commercially available from Hitachi Ltd. as Model XDM E2.

SUMMARY OF THE INVENTION

It is an object of the present invention to provide a file management method and system which can, in parallel, execute a batch process with a large volume of updating without interrupting the online process.

It is another object of the present invention to provide file management method and system which can rapidly execute a batch process in a non-exclusive manner without affecting an online transaction response.

It is a further object of the present invention to provide a file management method and system which can perform reorganization of records in a file during the online process.

It is another object of the present invention to provide a fault recovery method which eliminates the backup of a file in preparation of an abnormal ending of a batch process which updates a large number of files.

It is yet another object of the present invention to provide a file backup method which enables fast acquisition of a complete backup file during the execution of the online process.

In accordance with one aspect of the management method of files, such as a database, in the present invention, a record is updated by temporarily disconnecting an extended storage from the online process and continuing the online process for the reference process by using a file of a storage device (for example, a disk) and, in parallel, updating the record by using the extended storage as the batch process, and reloading the updated records on the extended storage collectively to the file of the storage media after the completion of the batch process to update the file.

Where the extended storage is used in the online process, an operation manager of the files issues a switch command to the file management system so that the file management system disconnects the extended storage from the online process and connects it for the batch process.

The file management system determines the file operation status to automatically connect or disconnect the extended storage to or from the online process.

Where the extended storage is not used in the online process, the file management system automatically allocates the extended storage for the execution of the batch process or releases the allocation.

Where the extended storage is used in the online process, the file management system does not disconnect the extended storage from the online process but dynamically allocates a new area of the extended storage for the batch process or releases the allocation.

A stand-alone extended storage which is a storage medium that can be shared by a plurality of data processing units is provided as a file storage device or an extended storage.

In accordance with another aspect of the present invention, a main storage is used in place of the extended storage to update a file.

Where a storage status of a record in a file is disturbed by the repetition of the random storing of the record, it is reorganized by using the above updating method of the file in accordance with a logical arrangement of the record.

Where a configuration of a file is to be modified, a record is relocated by using the above updating method of the file.

In the updating method of the file, if a fault occurs during the updating of the extended storage, the content of the record is recovered from the file in the storage device (for example a disk), and if a fault occurs during the updating of the file, the content of the record is reloaded from the extended storage for recovery of the record content.

In the updating method of the file, the reference of a large volume of files and the backup process of the file are conducted instead of the batch process to update the record.

Further, an extended storage is provided as a storage device for a file, and after the completion of the batch process, the extended storage for the on line process is exchanged with the extended storage for the batch process instead of the reload process of the updated record.

The operations of the above aspects are explained. In the context of data in a normal online process, if target data is present in the extended storage, data from the extended storage is input to an input/output buffer of the main storage. If the target data is not present in the extended storage, data is input from the file.

When a large volume of updating is to be made for the file referred by the online process, the extended storage is disconnected from the online process and the online process is switched to a path which directly inputs data from the file to input/output buffers. The batch process rapidly executes, in parallel, a large volume of updating using the disconnected extended storage. When the updating in the extended storage is completed, the extended storage is reconnected to the online process and the updated content of the extended storage is selectively reloaded to the file.

By those features, a large volume of updating of the file can be rapidly attained without interrupting the online process. In addition, the batch process can be rapidly executed, in parallel, without a wait status for the online process.

Recovery for a fault occurring during the updating of the extended storage disconnected from the online process can be attained by merely invalidating the updated information of the extended storage. When a fault occurs during the selective reloading of the updated records of the extended storage to the file, the file may be recovered from the extended storage because the extended storage has been updated to the latest state. Thus, the backup of the file in preparation for the abnormal ending of the updating job is eliminated.

DESCRIPTION OF THE PREFERRED EMBODIMENTS

Figure 1:
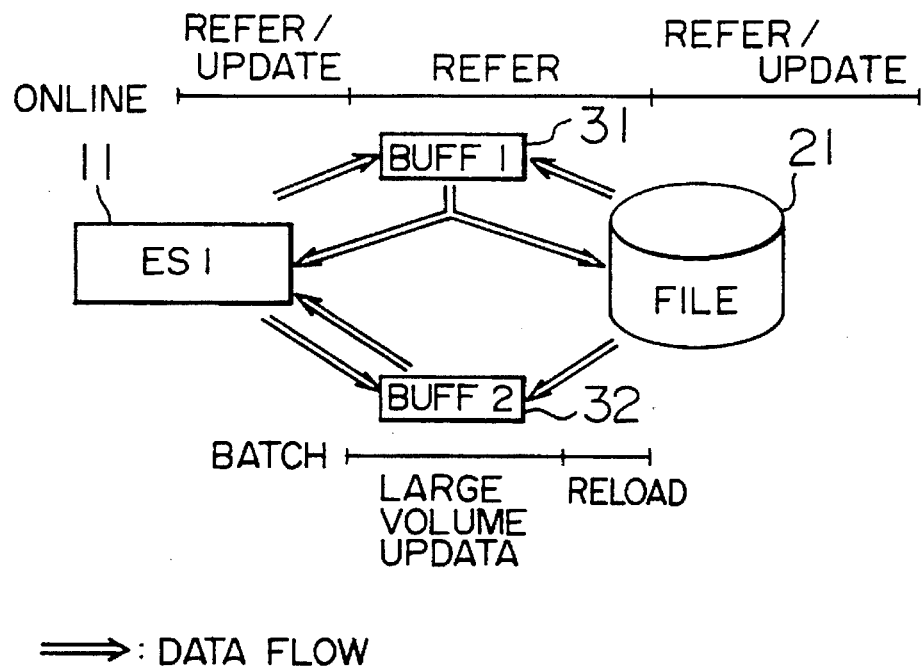
FIG. 1 shows a configuration for explaining one embodiment of the file management method of the present invention.

A first embodiment of an overall configuration of a system of the present invention is first explained with reference to FIG. 17. The file management system of the present embodiment comprises a data processing unit 5, an external storage file 21, and an input/output buffer (BUFF1) 31 which is used in the online process and an input/output buffer (BUFF2) 32 which is used in the batch process and a file management table 191 and a user space management table 241 provided in the data processing unit 5, and an extended storage 1. The extended storage 1 includes areas (ES1) 11 and (ES2) 12 (12 may be excluded) correspondingly to the files.

In the ordinary online process, data is input from the file 21 to the input/output buffer (BUFF1) 31 through the extended storage (ES1) 11 in the data reference mode, and the data of the input/output buffer (BUFF1) 31 is output to the file 21 in the data update mode (data flow 1). When the batch process is to be executed, the online process is switched to the read-only mode (reference mode) and the online process inputs the data from the file 21 to the input/output buffer (BUFF1) 31 without routing the extended storage (ES1) 11 (data flow 2). In the data reference mode in the batch process, the data is input from the file 21 to the input/output buffer (BUFF2) 32 through the extended storage (ES1) 11 (data flow 3). If there is target data in the extended storage (ES1) 11, the file 21 is not accessed but the data is transferred from the extended storage (ES1) 11 to the input/output buffer (BUFF2) 32. In the data update mode in the batch process, the data of the input/output buffer (BUFF2) 32 is output to only the extended storage 11 and it is not output to the file 21 (data flow 4). Namely, the content of the file 21 is frozen. When the batch process is completed, the access path of the online process is switched so that, in the online process, the data is input from the extended storage 11 to the input/output buffer (BUFF1) 31 (data flow 6). The data to be referred which is not present in the extended storage 11 is input from the file 21 to the input/output buffer (BUFF1) 31 (data flow 2). Then, the updated data stored in the extended storage 11 is collectively output to the file 21 (data flow 5). (This is referred to as a reload process). When the reload process is completed, the access path in the online process is switched to route the extended storage (ES1) 11 to return the online process to the read/write mode.

Figure 18:
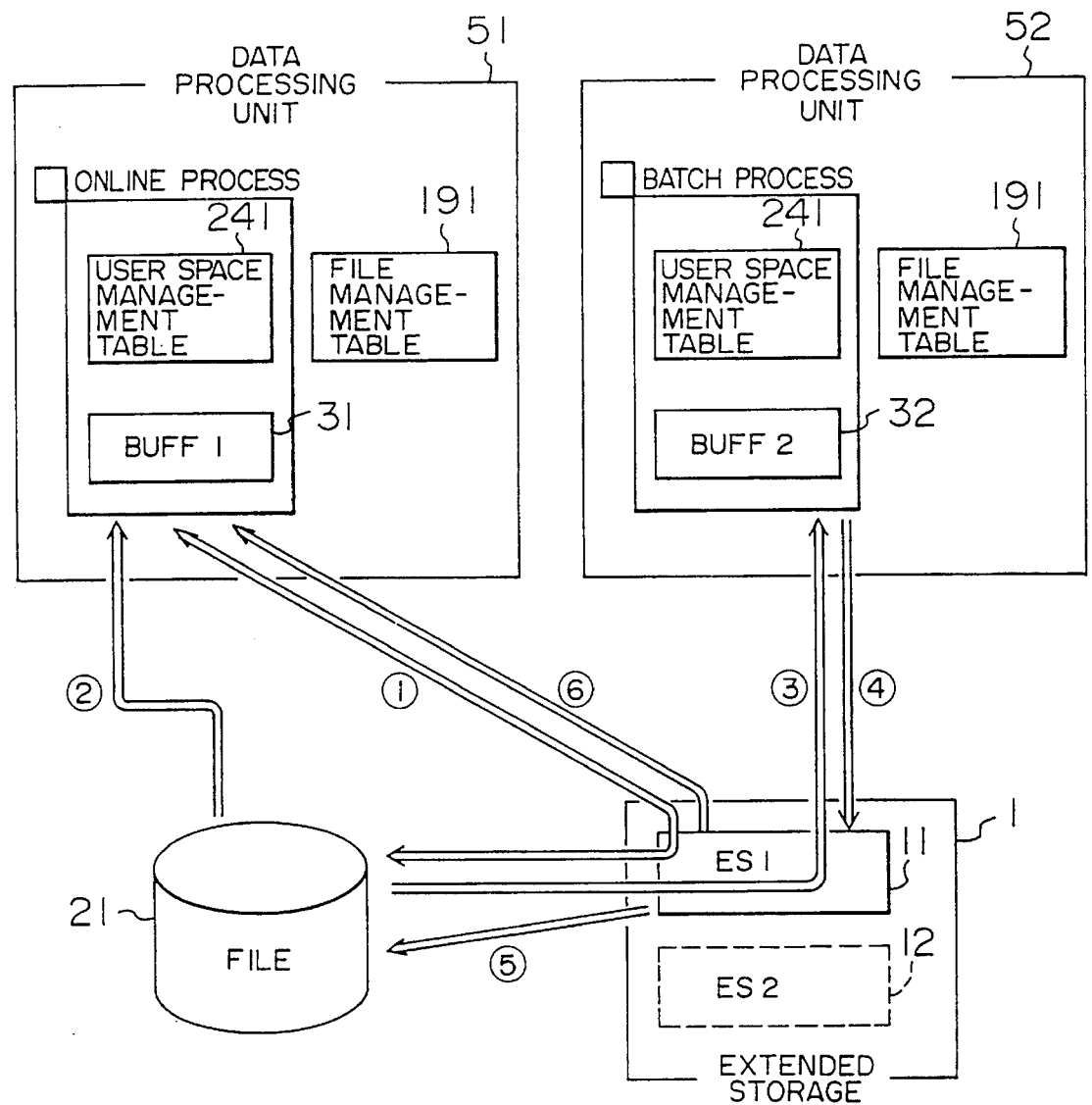
FIG. 18 shows a second embodiment of the overall configuration of the system of the present invention.

Referring to FIG. 18, another embodiment of the overall configuration of the present invention is explained. The file management system of the present embodiment comprises a plurality of data processing units 51 and 52, an external storage file 21, an input/output buffer (BUFF1) 31 which is used in the online process, an input/output buffer (BUFF2) 32 which is used in the batch process, a file management table 191, a user management table 241 in the data processing unit 51, an input/output buffer (BUFF3) 33 which is used in the online process, an input/output buffer (BUFF4) 34 which is used in the batch process (34 may be excluded), a file management table 192 and a user space management table 242 in the data processing unit 52, and a stand-alone extended storage which is independent from data processing units 51 and 52. The extended storage 1 includes areas 11 (ES1) and 12 (ES2) (12 may be excluded) correspondingly to the files.

Figure 17:
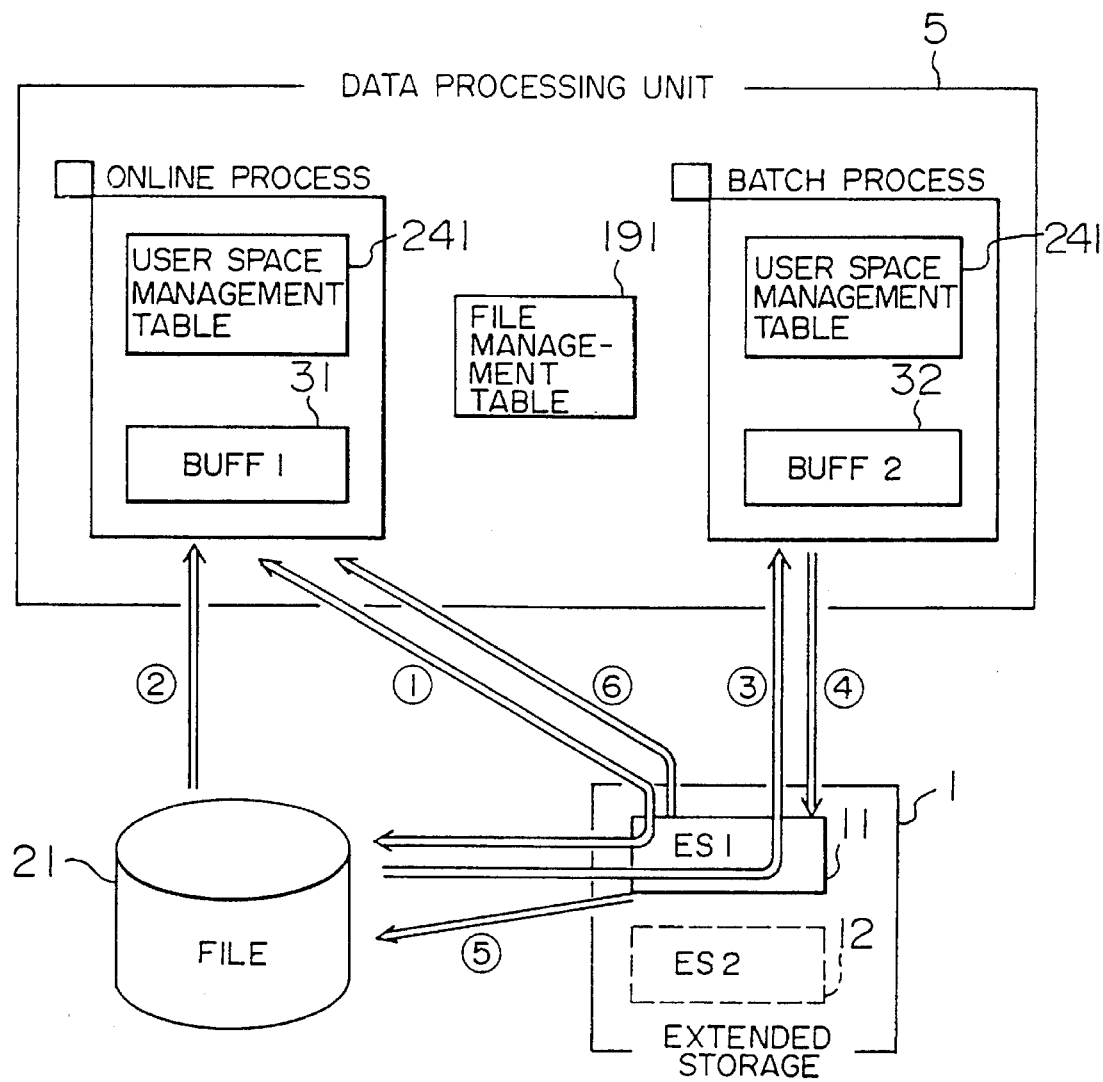
FIG. 17 shows a first embodiment of an overall configuration of a system of the present invention.

The operation explained for the embodiment of FIG. 17 equally applies to the present embodiment in which the file 21 is shared by the plurality of data processing units, and the online process and the batch process may be executed by the separate data processing units. In such a case, the access path in the online process is switched by the control by the communication between the data processing units or by writing the control information into the extended storage and inputting the control information in the online process.

Figure 19:
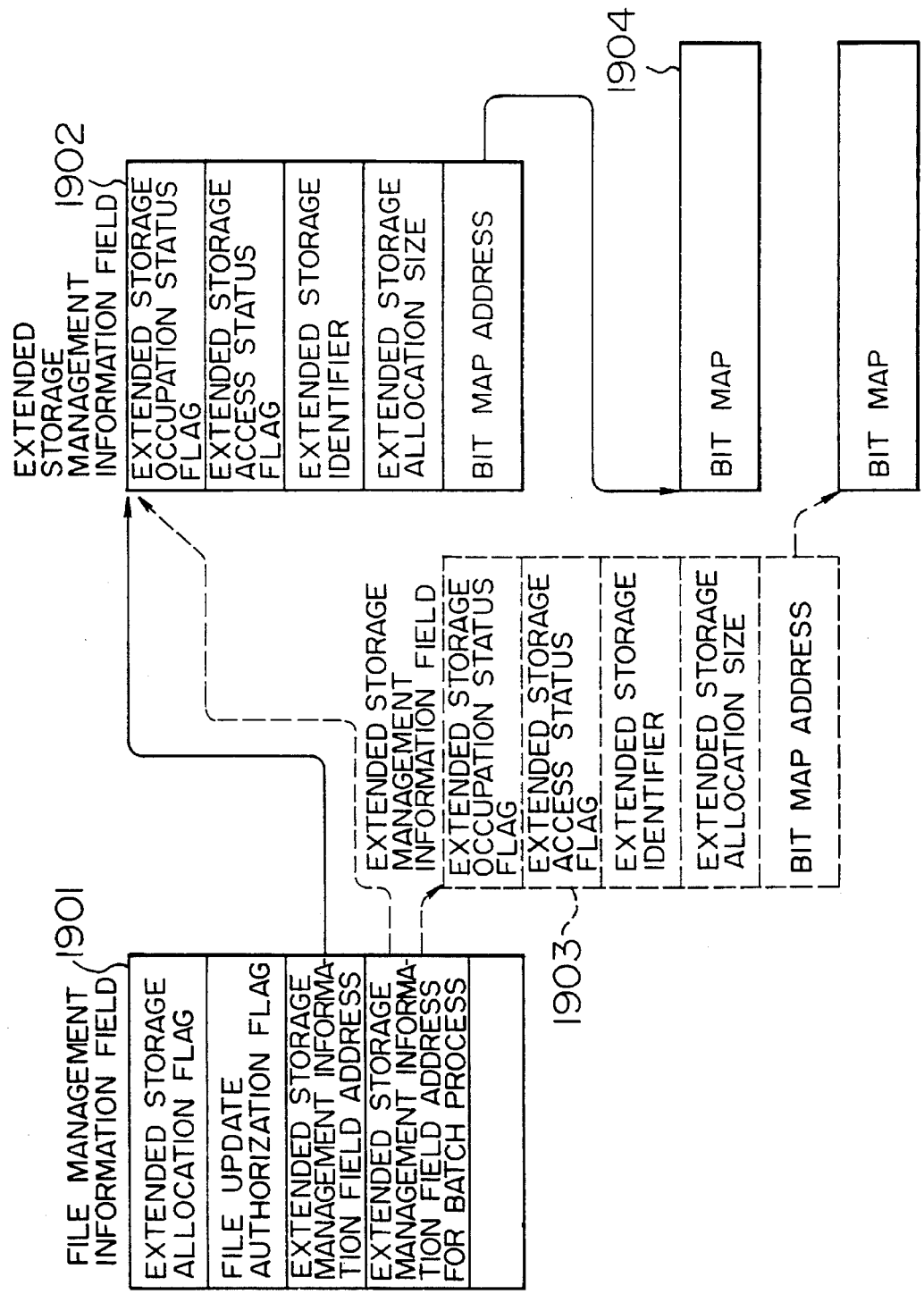
FIG. 19 shows a file management table in an embodiment of the present invention.

File management tables 191 and 192 in the present embodiment are explained with reference to FIG. 19. The file management table 191 (or 192) is secured in the data processing unit for each file 21 and it includes a file management information field 1901, extended storage management information fields 1902 and 1903 and a bit map field 1904. The file management information field includes an extended storage allocation flag for identifying a file having a designation to allocate to the extended storage, a file update authorization flag for managing an update authorization for the file 21, an address of the extended storage management information field 1902, and an address of the extended storage management information field 1903 for the batch process (which is identical to the address of the extended storage management information field when the extended storage dedicated to the batch process is not separately provided). The extended storage management information field 1902 (or 1903) includes an extended storage occupation status flag for indicating the occupation by the batch process of the area 11 (or 12) of the extended storage 1 corresponding to the file 21, an extended storage access status flag for managing the update in-process status of the extended storage, an extended storage identifier for identifying the area in the extended storage, an extended storage allocation size for storing a size of the area of the extended storage allocated to the file, and a bit map address for storing the address to the bit map for managing the page status in the extended storage. The page represents a frame in which an index record stores a data record in the file. For example, the page size is 4K bytes. The bit map 1904 of the present embodiment is explained with reference to FIG. 20. The bit map 1904 is held in the data processing unit or the extended storage for each area of the extended storage. Each page of the file 21 includes a load completion flag for indicating the completion of load to the extended storage, a batch updated flag indicating the page in the extended storage which was updated in the batch process, and an access inhibit flag indicating the page in the extended storage which cannot be accessed. It further includes a bit train for each page of the file 21, one for each page of the file 21.

Figure 24:
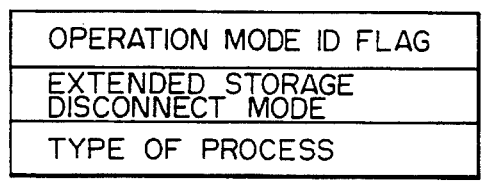
FIG. 24 shows a user space management table in an embodiment of the present invention.

The user space management table 241 of the present embodiment is explained with reference to FIG. 24. The user space management table 241 is held in the data processing unit for each active user space, and each user space includes an operation mode identification flag for identifying the batch process or the online process, an extended storage disconnection mode flag for indicating whether the extended storage is to be manually disconnected or automatically disconnected, and a type of process flag for indicating whether the update process is to be executed or only the reference process is to be executed.

The overall operation of the data management method is now explained with reference to FIGS. 1–4.

FIG. 1 shows a data flow in the present embodiment. A hardware configuration for the operation in the embodiment of the online data processing system of the present invention comprises a file storage medium 21, a storage area 11 (ES1) allocated to the extended storage which is a storage accessible without mechanical movement, and input/output buffers (BUFF1 and BUFF2) 31 and 32 in the data processing unit. Individual operation phases of FIG. 1 are shown in FIGS. 2–4.

Figure 2:
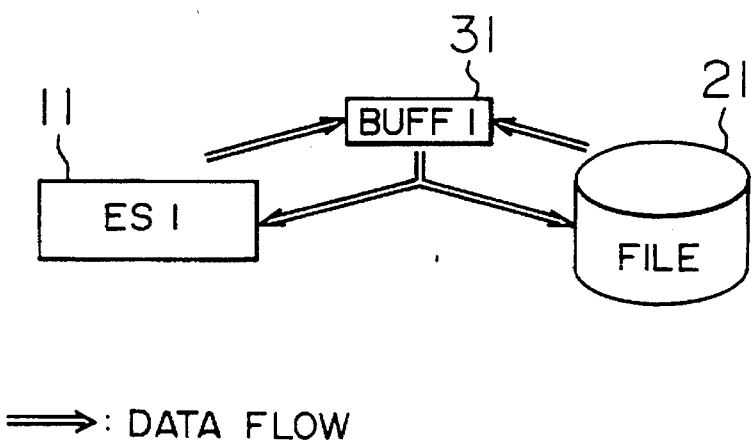
FIG. 2 shows a flow chart of data in an ordinary online process.

FIG. 2 shows a data flow in the ordinary online process. The hardware configuration therefor comprises the file storage medium 21, the extended storage (ES1) 11 and the input/output buffer (BUFF1) 31.

Figure 3:
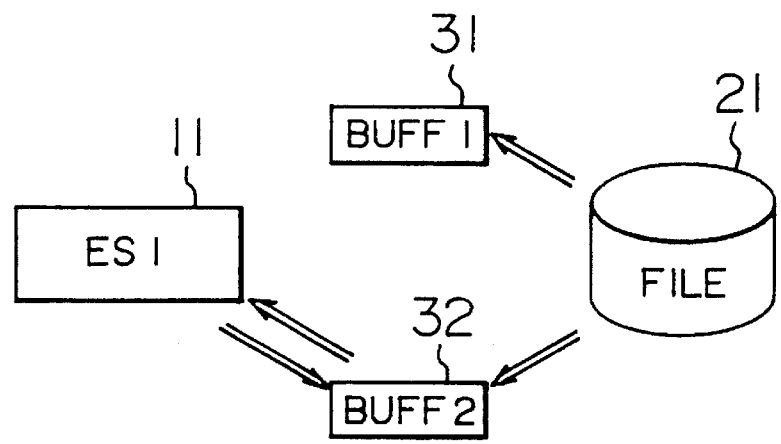
FIG. 3 shows a flow chart of data when a batch process is executed during an online process in an embodiment of the present invention.

FIG. 3 shows a data flow when the batch process is executed during the execution of the online process. The hardware configuration therefor comprises the file 21, the extended storage (ES1) 11 and the input/output buffers (BUFF1) 31 and (BUFF2) 32.

Figure 4:
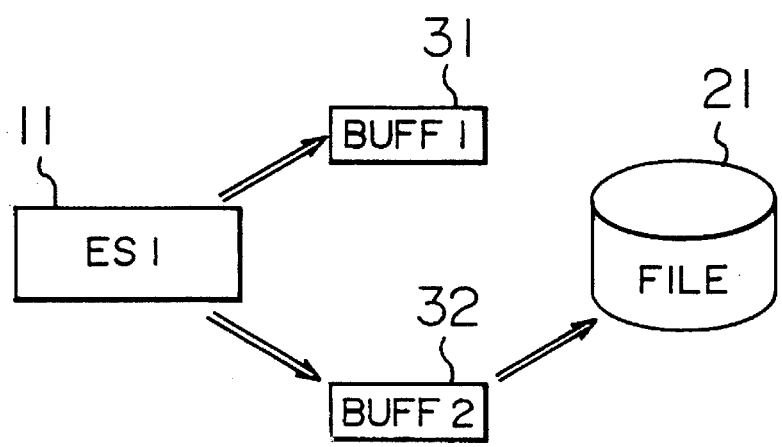
FIG. 4 shows a flow chart of data in a selective reload process of updated records to a file after the execution of a batch process in an embodiment of the present invention.

FIG. 4 shows a data flow in the reload process of the updated record to the file 21 after the execution of the batch process. In the online process, the extended storage (ES1) 11 serves as an intermediate storage area between the input/output buffer (BUFF1) 31 and the file 21, and when the record is to be referred, if a page which stores a target record is present in the extended storage (ES1) 11, the page is input from the extended storage (ES1) 11 to the input/output buffer (BUFF1) 31, and a page which is not present in the extended storage (ES1) 11 is input from the file 21 to the input/output buffer (BUFF1) 31 and it is also output to the extended storage (ES1) 11 in parallel. When the record is updated, the content of the input/output buffer (BUFF1) 31 is output to the file 21 and also to the extended storage (ES1) 11. When the batch process is to be executed, the extended storage (ES1) 11 is disconnected from the online process by the extended storage disconnection process and the update authorization of the file to the "batch only". Thereafter, when a page input request occurs in the online process, the extended storage (ES1) 11 is not used but the page is input from the file 21 to the input/output buffer (BUFF1) 31. On the other hand, when the record is to be input in the batch process, if there is a corresponding page in the extended storage (ES1) 11, the page is input from the extended storage (ES1) 11 to the input/output buffer (BUFF2) 32, and the page which is not present in the extended storage (ES1) 11 is input from the file 21 to the input/output buffer (BUFF2) 32 and it is also output to the extended storage (ES1) 11. If the record is updated in the batch process, the updated page is output to the extended storage (ES1) 11 but not to the file 21. When the updating in the batch process is completed, the object of reference in the online process is switched from the file 21 to the extended storage (ES1) 11 and the updated page stored in the extended storage (ES1) 11 is collectively reloaded to the file by the updated page reload process in parallel. When the reloading of the updated page is completed, the extended storage (ES1) 11 is reconnected to the online process by the extended storage reconnection process (which will be described later) and the online updating inhibit status is released.

Figure 15:
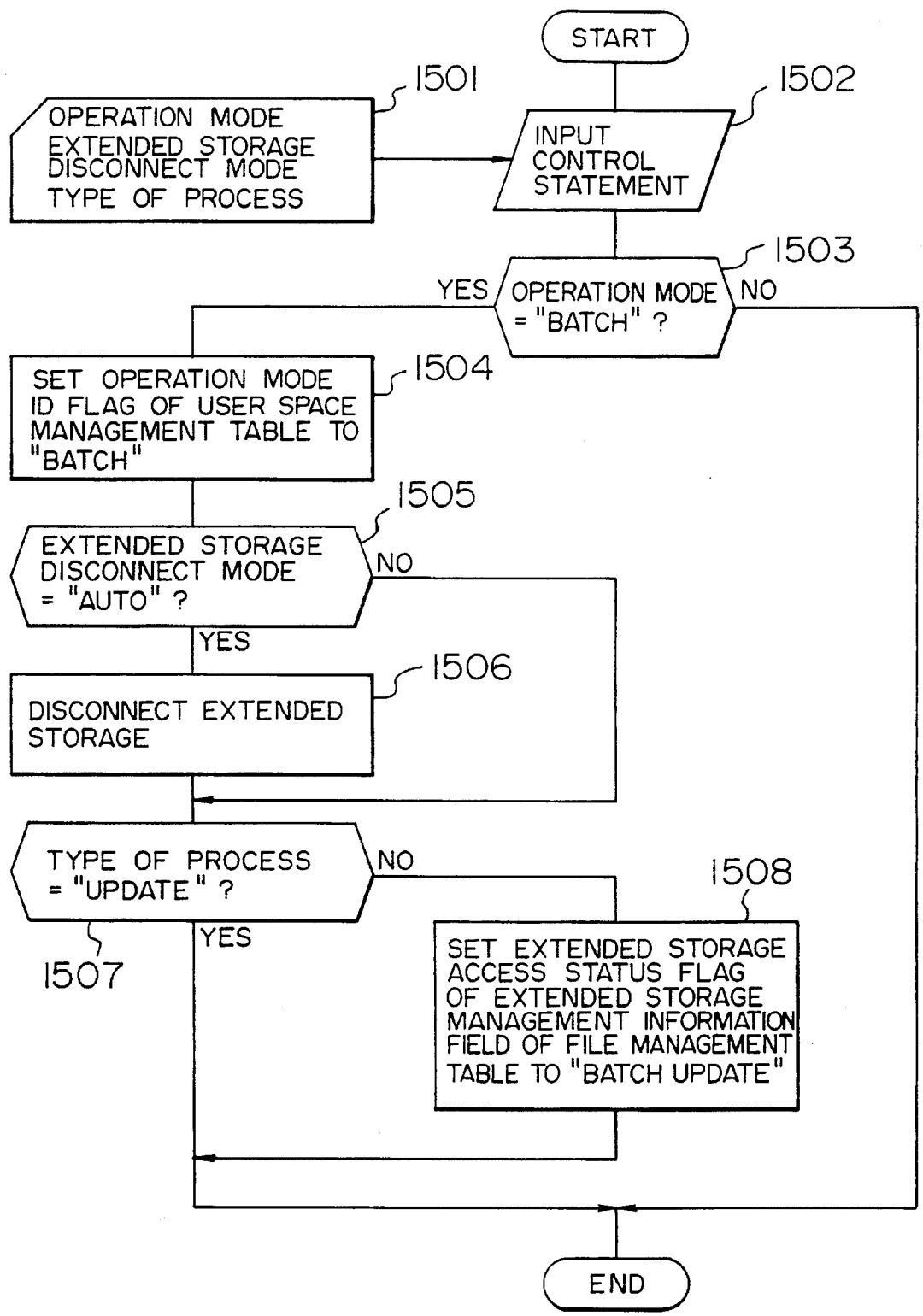
FIG. 15 shows a flow chart of a transaction start process in an embodiment of the present invention.

A transaction start process and a transaction end process are first explained. A procedure of the transaction start process is explained with reference to FIG. 15. The operation mode for indicating the batch process or the online process, the extended storage disconnection mode for indicating whether the extended storage is to be disconnected automatically or manually by a user of the file management system, and the type of process for indicating whether to update the file or not, are input (1502) as a control statement (1501). The operation mode is determined (1503), and if it is "batch" the operation mode identification flag of the user space management table is set to "batch" (1504).

Then, the extended storage disconnection mode is determined (1506), and if it is "auto" the extended storage is disconnected from the online process (or a new area of the extended storage is allocated) by the extended storage disconnection process (1506).

Then, the type of process is determined (1507). If it is "update", the extended storage access status flag of the extended storage management information field of the file management table is set to "batch update" (1508).

Figure 16:
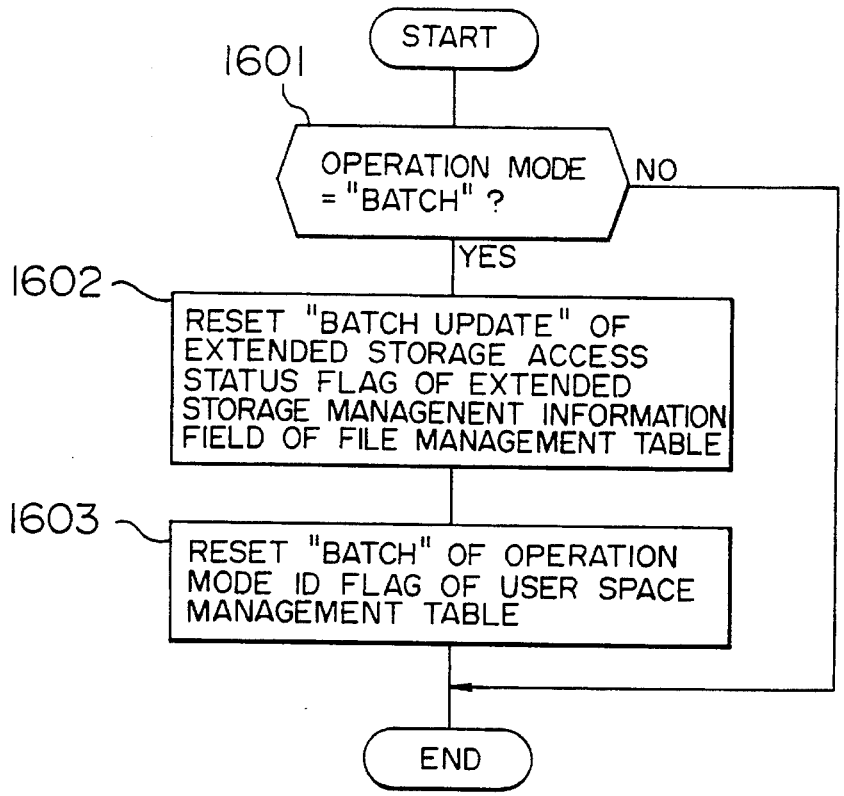
FIG. 16 shows a flow chart of a transaction ending process in an embodiment of the present invention.

A procedure of the transaction end process is now explained with reference to FIG. 16. Whether or not the operation mode identification flag of the user space management table is "batch" is determined (1601) If it is "batch" the "batch update" in the extended storage management information access status flag of the extended storage management information field of the file management table is reset (1602). Then, the "batch" in the operation mode identification flag of the user space management table is reset (1603).

Figure 7:
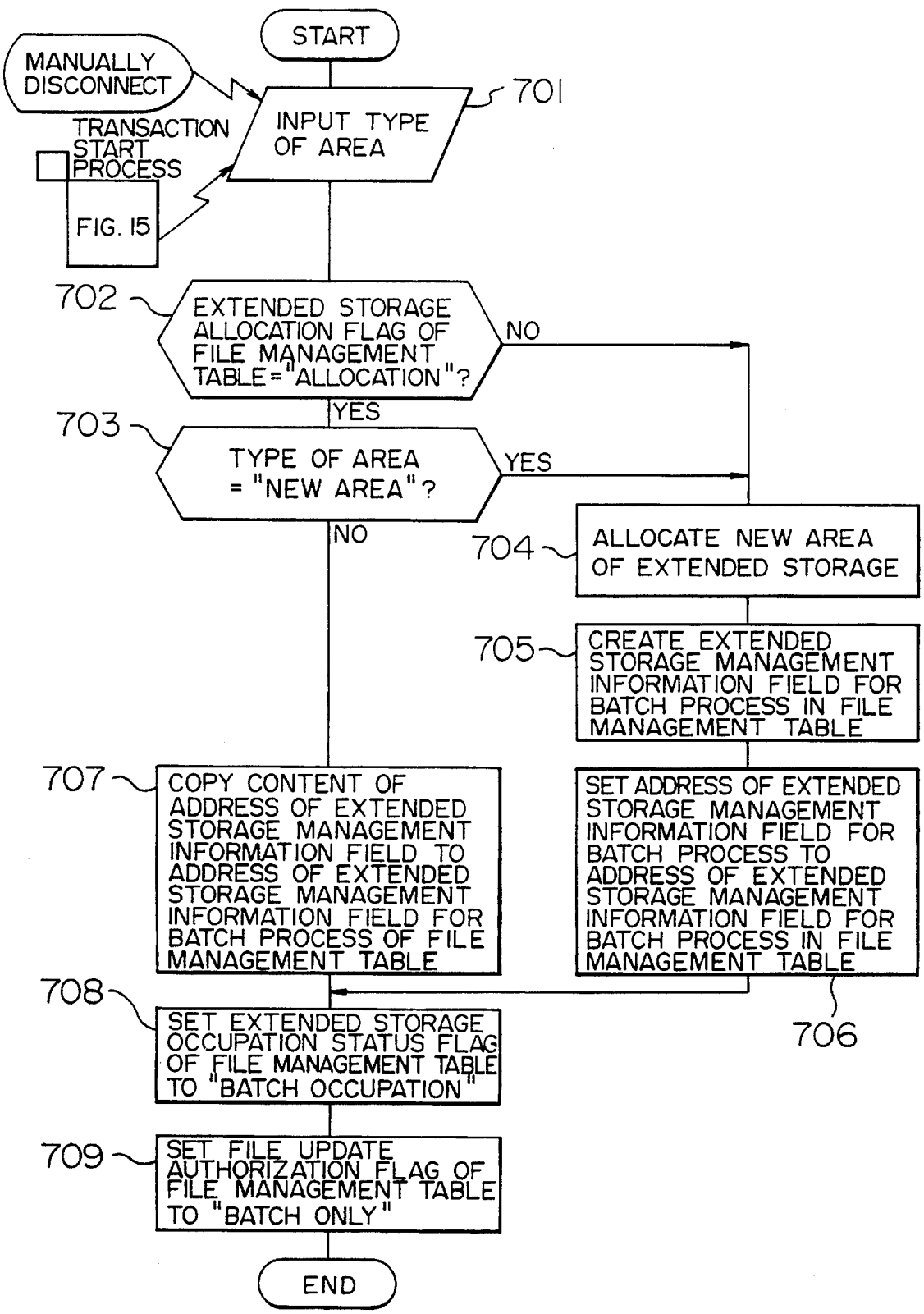
FIG. 7 shows a flow chart of a disconnection process of the extended storage in an embodiment of the present invention.

A procedure of the disconnection process of the extended storage (ES1) 11 from the online process is explained with reference to FIG. 7. When the disconnection of the extended storage (ES1) 11 is requested by a user of the file management system or from the transaction process (batch process) (701), whether the extended storage allocation flag of the file management table is "allocation" or not is determined (702). If it is "allocation" whether or not the request is to use a new area of the extended storage is determined (703). If it is the request to use the new area of the extended storage, the new area of the extended storage is allocated (704) and the extended storage management information field for the batch process is created (705), and an address of the extended storage management information field corresponding to the new area of the extended storage is set for the address of the extended storage management information field for the batch process of the file management table (706). If the extended storage allocation flag of the file management table is not "allocation" a new area of the extended storage is allocated (704), the extended storage management information field for the batch process is created (705), and the address of the extended storage management information field corresponding to the new area of the extended storage is set for the address of the extended storage management information field for the batch process of the file management table (706). If the request is not to use a new area of the extended storage, the address of the extended storage management information field is set for the address of the extended storage management information field for the batch process (707). The extended storage occupation status flag of the file management table is set to "batch occupation" (708). Thus, the online process can no longer access the extended storage. The file update authorization flag of the file management information field of the file management table is set to "batch only" (709) to suppress the update request from any process other than the batch process.

Figure 8:
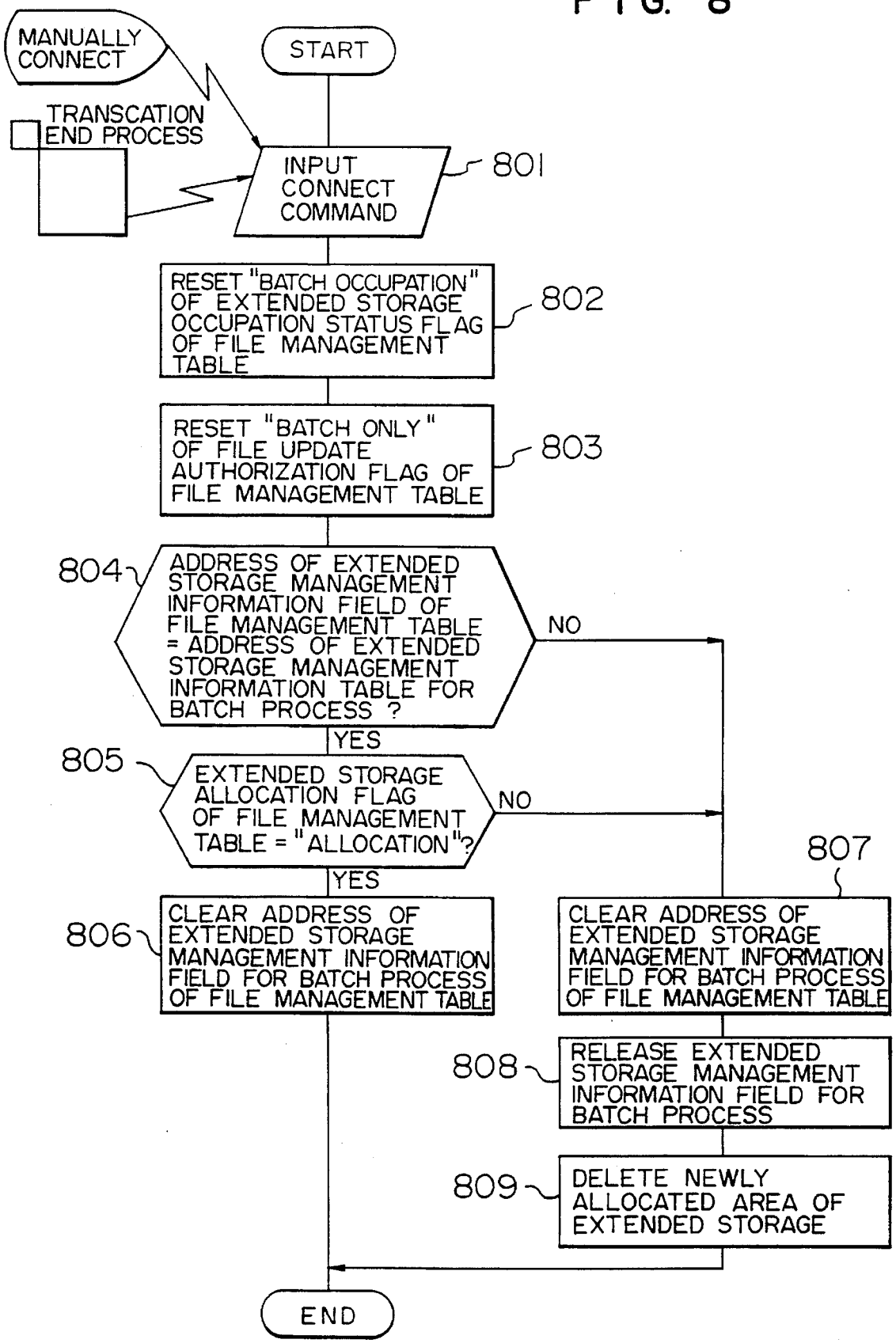
FIG. 8 shows a flow chart of a reconnection process of the extended storage in an embodiment of the present invention.

A procedure of the reconnection process of the extended storage (ES1) 11 to the online process is explained with reference to FIG. 8. When the reconnection of the extended storage is commanded (801), the "batch occupation" status of the extended storage occupation status flag of the file management table is reset (802). Thus, the extended storage may be referred from the online process. The "batch only" status of the file update authorization flag of the file management information field of the file management table is reset (803). Thus, the extended storage may be updated from the online process. Whether the address of the extended storage management information field of the file management table matches to the address of the extended storage management information field for the batch process is determined (804). If they match, whether the extended storage allocation flag of the file management table is "allocation" is determined (805) If it is "allocation", the address of the extended storage management information field for the batch process of the file management table is cleared (806). If the extended storage allocation flag is not "allocation", the address of the extended storage management information field for the batch process of the file management table is cleared (807), the extended storage management information field for the batch process is reset (808), and the area of the extended storage corresponding to the extended storage management information field for the batch process is deleted (809). When the address of the extended storage management information field of the file management table does not match to the address of the extended storage management information field for the batch process, the address of the extended storage management information field for the batch process of the file management table is cleared (807), the extended storage management information field for the batch process is released (808), and the area of the extended storage corresponding to the extended storage management information field for the batch process is deleted (809).

Figure 9:
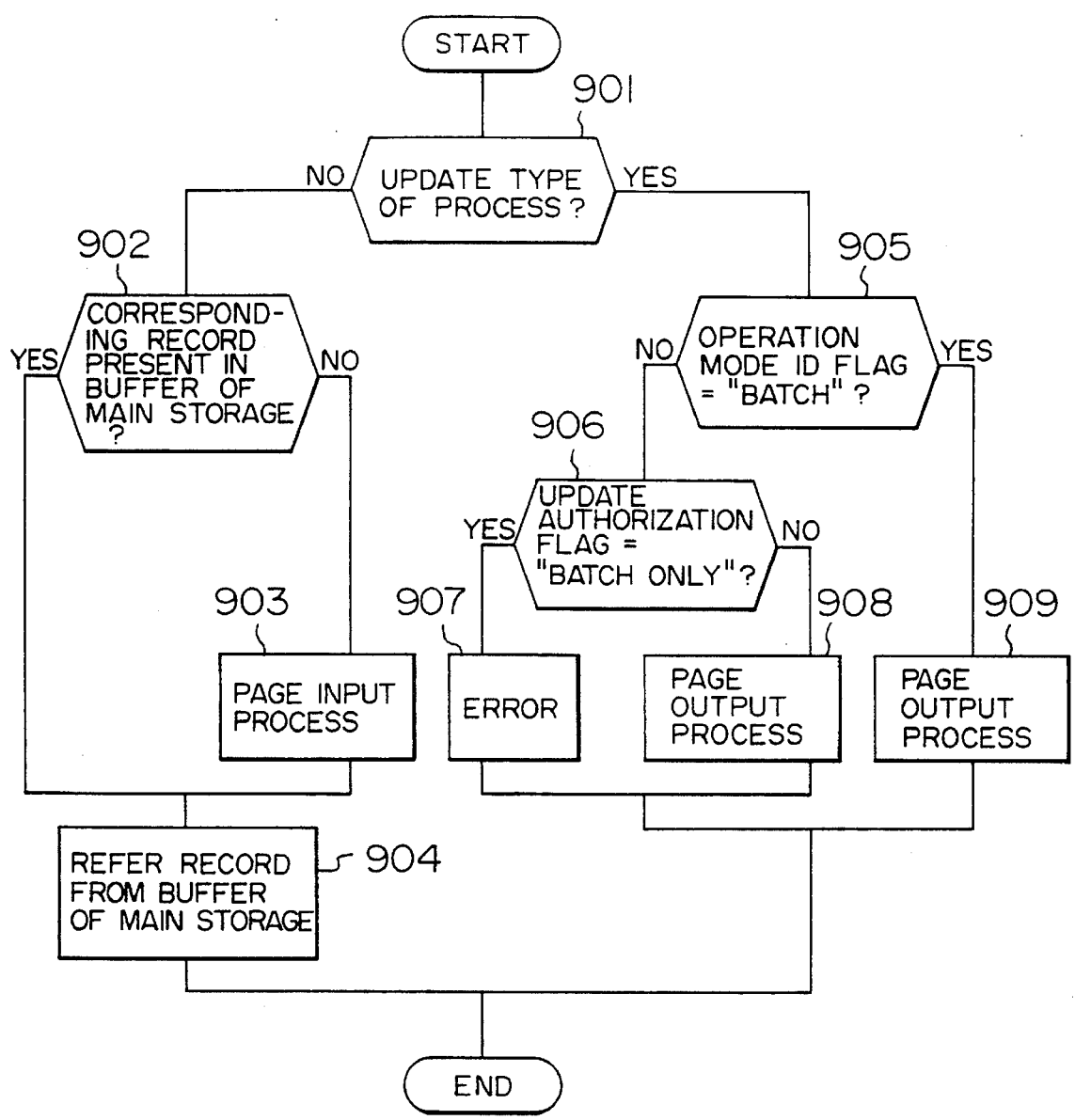
FIG. 9 shows a flow chart of record operation process in an embodiment of the present invention.

A process of the record process is explained with reference to FIG. 9. When reference to a record is requested (901), whether or not a page which stores the target record is present in the input/output buffer 31 (the input/output buffer 32 in the batch process) is determined (902). If it is present in the input/output buffer (BUFF1) 31 (the input/output buffer (BUFF2) 32 in the batch process), the Page in the input/output buffer (BUFF1) 31 (the input/output buffer (BUFF2) in the batch process) is referred (904). If it is not present in the input/output buffer (BUFF1) 31 (the input/output buffer (BUFF2) 32 in the batch process), the page is input to the input/output buffer (BUFF1) 31 (the input/output buffer (BUFF2) 32 in the batch process) and then the page is referred. When the updating of record is requested (901), whether or not it is the batch process is determined by the operation mode identification flag of the user space management table (905). If it is not the batch process, the file update authorization flag of the file management information field of the file management table is examined (906) and if it is "batch only", the record update request is terminated in error (907). If the file update authorization flag is not "batch only", the updated page is output to the file 21 by the page output process (908). If it is the batch process, the updated page is output to the extended storage (ES1) 11 by the page output process (909).

Figure 10:
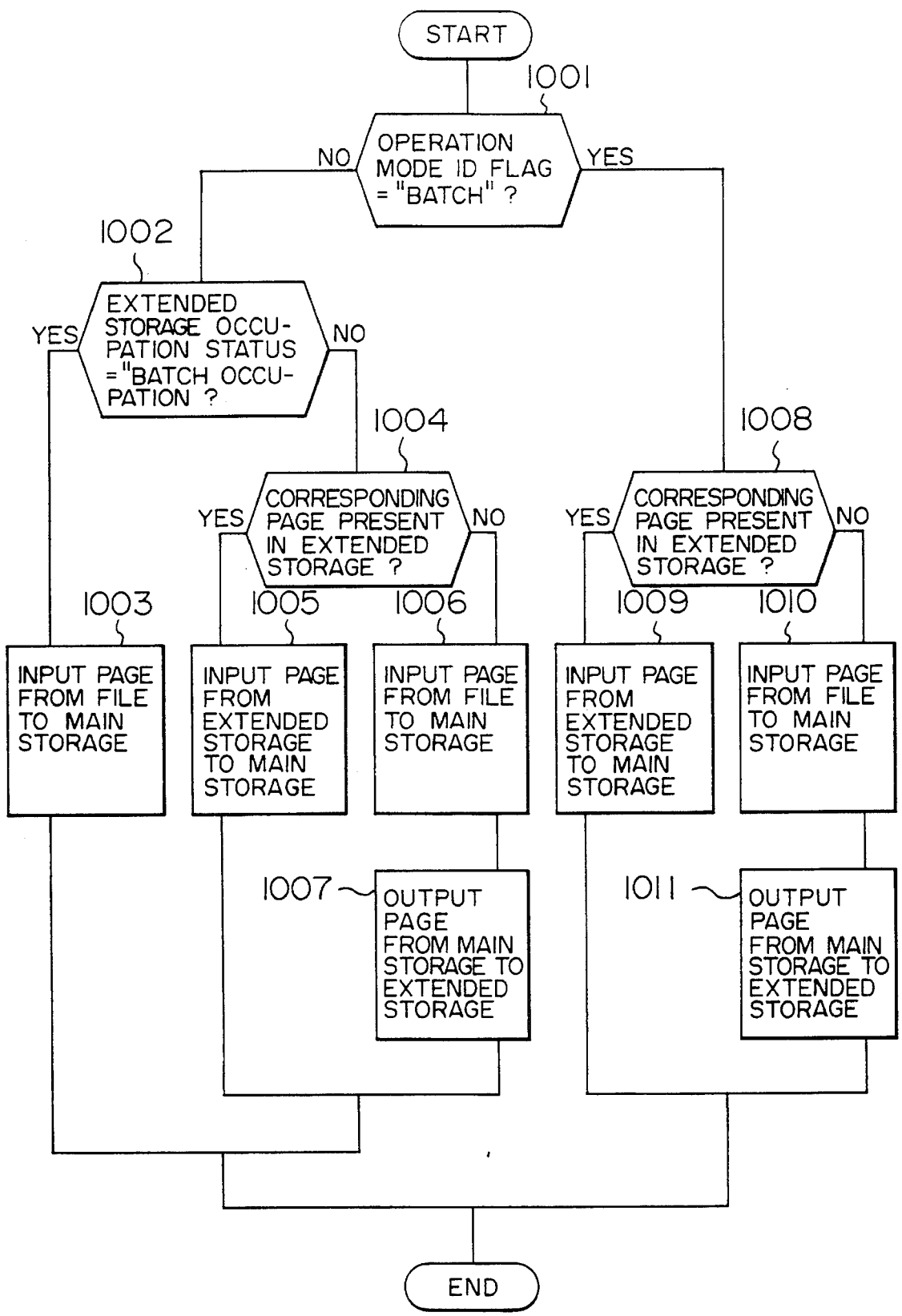
FIG. 10 shows a flow chart of a page input process in an embodiment of the present invention.
Figure 20:
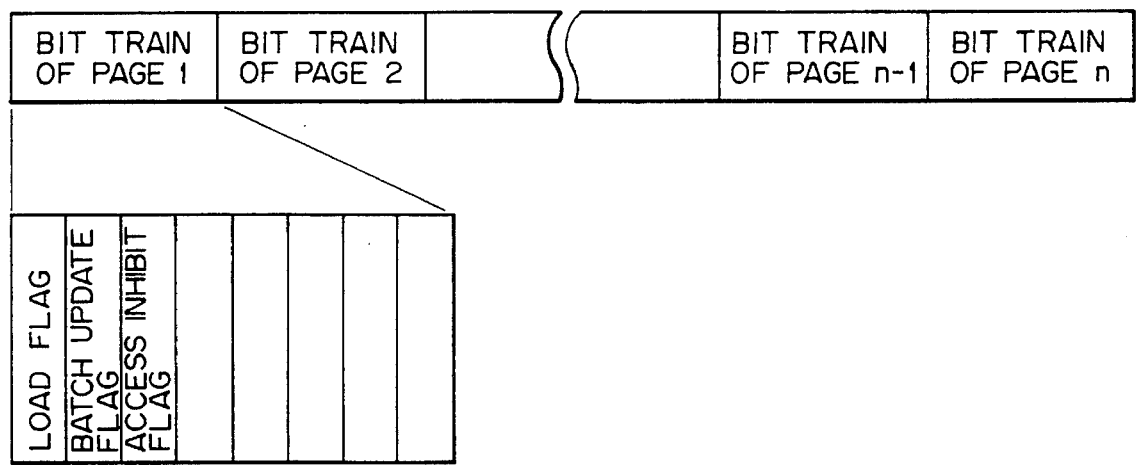
FIG. 20 shows a bit map in an embodiment of the present invention.

Details of the page input process (903) are explained with reference to FIG. 10. Whether or not it is the batch process is determined by the operation mode identification flag of the user space management table (1001). If it is not the batch process, whether or not the extended storage occupation status flag of the file management table is "batch occupation" is determined (1002), and if it is "batch occupation", the page is input from the file 21 to the input/output buffer (BUFF1).31 (1003). If it is not "batch occupation", the bit map (which, as shown in FIG. 20, is a table having a plurality of bit columns for each page of the file 21 to manage the updating status of the page in the extended storage) is examined (1004) to determine whether or not the corresponding page is present in the extended storage (ES1) 11 or not. If the corresponding page is present in the extended storage (ES1) 11, the page is input from the extended storage (ES1) to the input/output buffer (BUFF1) 31 (1005). If the corresponding page is not present in the extended storage (ES1) 11, the page is input from the file 21 to the input/output buffer (BUFF1) 31 (1006) and the corresponding page is outputted from the input/output buffer (BUFF1) 31 to the extended storage (ES1) 11 (1007). In the batch process, whether or not the corresponding page is present in the extended storage (ES1) 11 is examined by the bit map (1008), and if the corresponding page is present in the extended storage (ES1) 11, the page is input from the extended storage (ES1) 11 to the input/output buffer (BUFF2) 32 (1009). If the corresponding page is not present in the extended storage (ES1) 11, the page is input from the file 21 to the input/output buffer (BUFF2) 32 (1010) and the corresponding page is output from the input/output buffer (BUFF2) 32 to the extended storage (ES1) 11 (1011).

Figure 11:
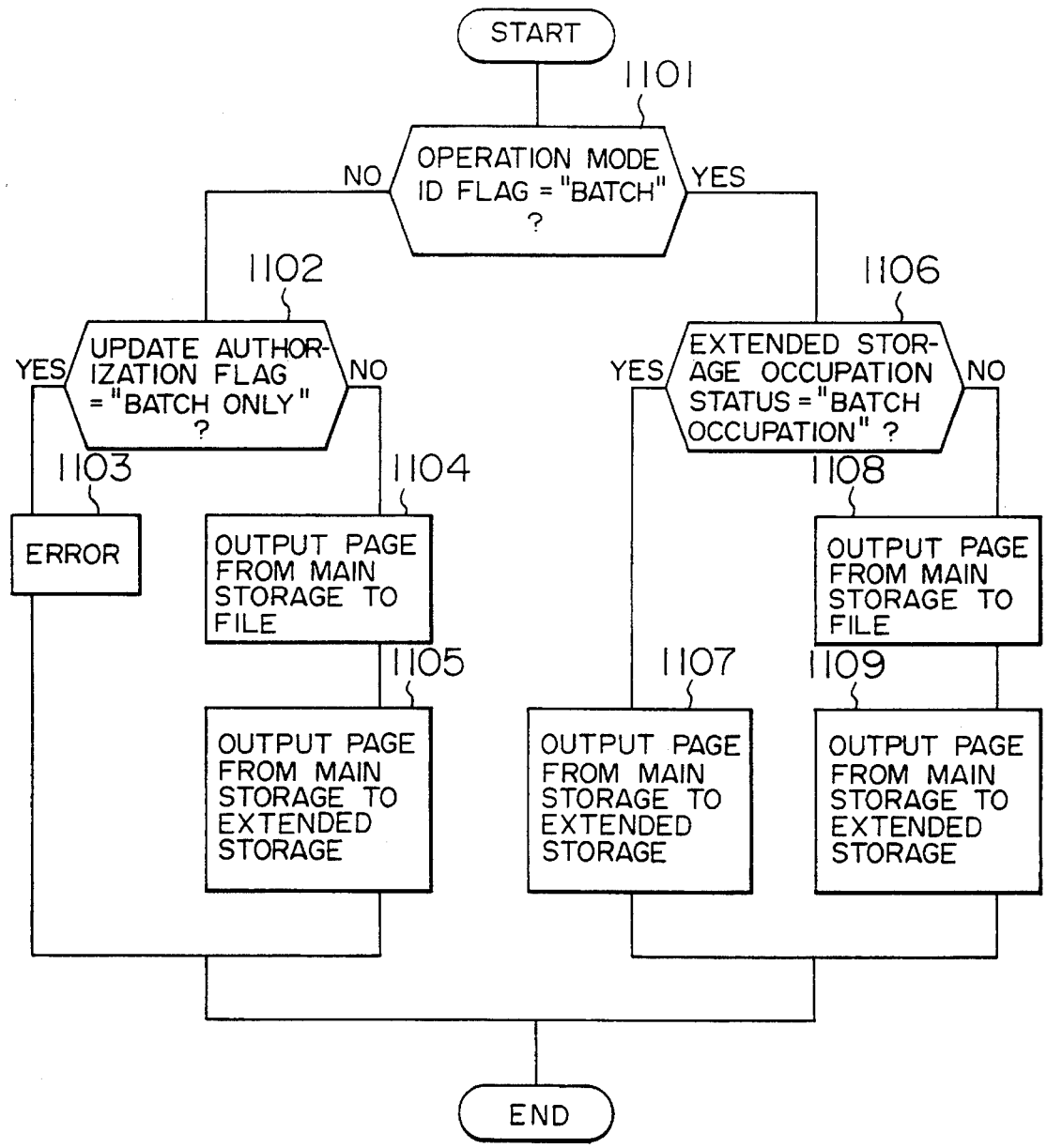
FIG. 11 shows a flow chart of a page output process in an embodiment of the present invention.
Figure 12:
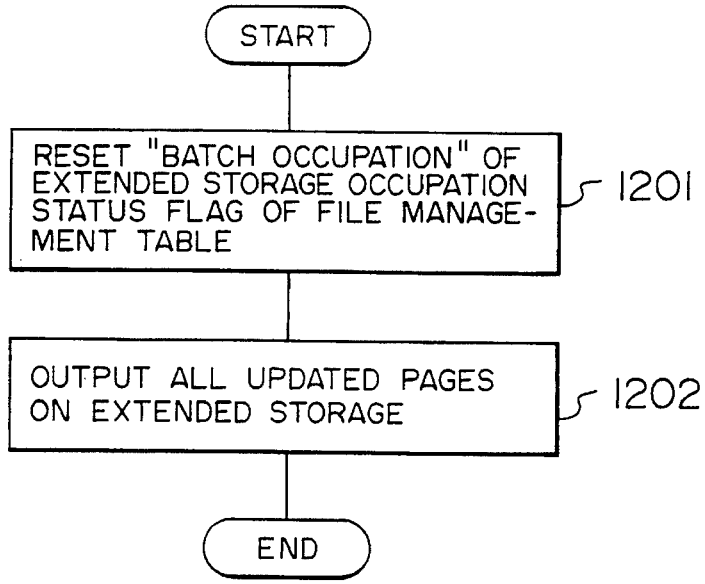
FIG. 12 shows a flow chart of a reload process of an updated page in an embodiment of the present invention.

Details of the page output process (908,909) explained with reference to FIG. 11. Whether or not it is the batch process or not is determined by the operation mode identification flag of the user space management table (1101). If it is not the batch process, the file update authorization flag of the file management information field of the file management table is examined (1102) If it is not "batch only", the page is output from the input/output buffer (BUFF1) 31 to the file 21, and the page is also output from the input/output buffer (BUFF1) 31 to the extended storage (ES1) 11. In the batch process, whether or not the extended storage occupation status flag of the file management table is "batch occupation" is determined (1106), and if it is "batch occupation", the page is output from the input/output buffer (BUFF2) 32 to the extended storage (ES1) 11 (1107). If it is not "batch occupation", the page is output from the input/output buffer (BUFF2) 32 to the file 21, and the page is output from the input/output buffer (BUFF2) 32 to the extended storage (ES1) 11 (1109).

An operation of the updated page reload process to write the updated page of the extended storage (ES1) 11 to the file 21 is explained. The "batch occupation" status of the extended storage occupation status flag of the file management table is reset (1201). At this time, the extended storage (ES1) 11 may be referred by the online process. Then, the updated page on the extended storage (ES1) 11 is outputted to the file 21 in accordance with the bit map (1202).

Figure 5:
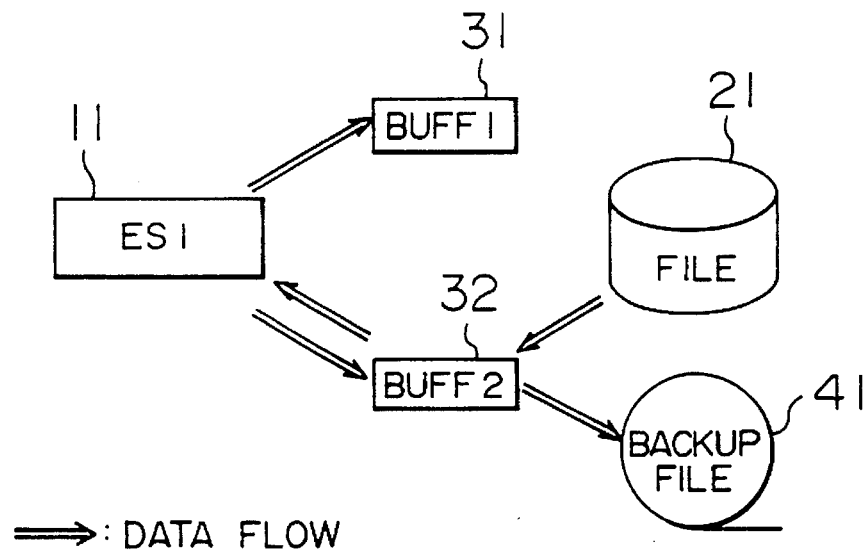
FIG. 5 shows a flow chart of data when a batch process is executed to acquire backup of a file or extract a large volume of data in an embodiment of the present invention.
Figure 13:
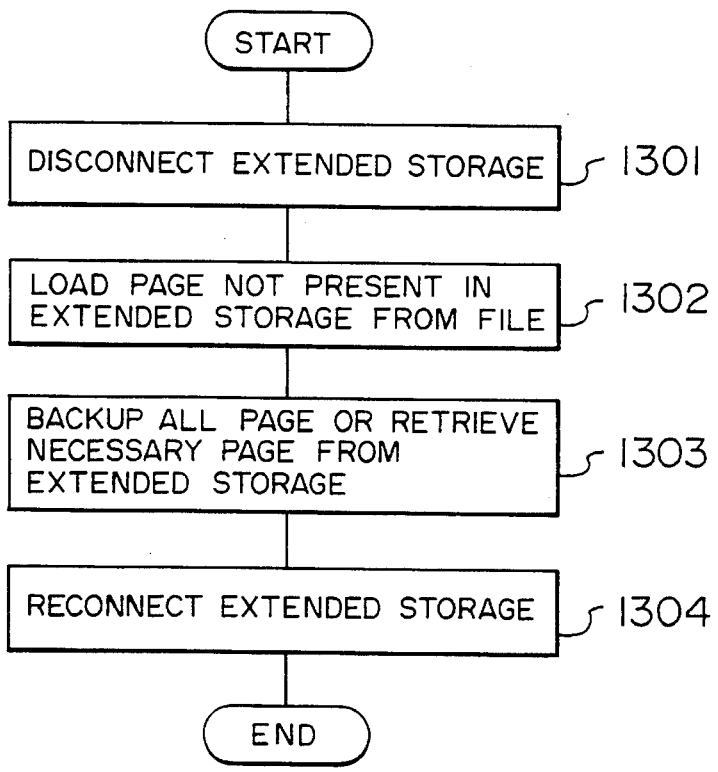
FIG. 13 shows a backup process of a file and a data retrieval process in an embodiment of the present invention.

An operation of the high speed backup acquisition in the online process and the retrieval of a large volume of data in the batch process is explained with reference to FIGS. 5 and 13. The extended storage (ES1) 11 is disconnected from the online process by the extended storage disconnection process (1301). The page which is not present in the extended storage (ES1) 11 is determined by the bit map and it is loaded to the extended storage (ES1) 11 from the file 21 through the input/output buffer (BUFF2) 32 (1302). Since all pages of the file 21 are present in the extended storage (ES1) 11 at this time, only the backup of the file 21 is executed and the retrieval includes only the transfer from the extended storage (ES1) 11 to the input/output buffer (BUFF2) 32. When the backup of the file 21 is to be acquired, the entire page is input from the extended storage (ES1) 11 to the input/output buffer (BUFF2) 32 (1303) and it is output to the backup file 41. Then, the extended storage (ES1) 11 is reconnected to the online process by the extended storage reconnect input/output buffer process (1304).

Figure 6:
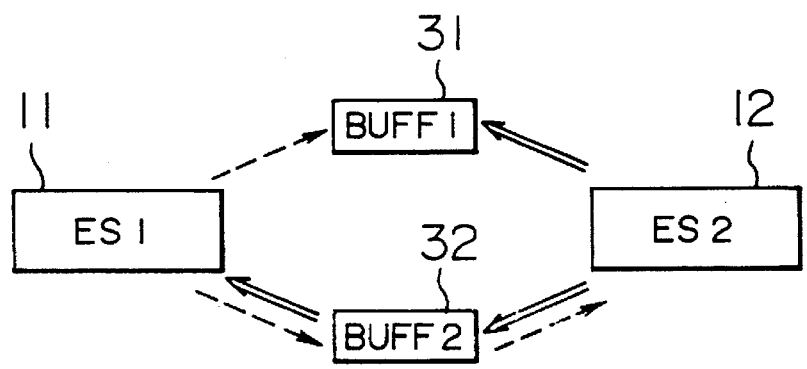
FIG. 6 shows a flow chart of data when an area allocated in an extended storage is used as a storage device of a file in an embodiment of the present invention.

The updating operation of the batch process in the online process when the extended storage is used as the storage device for the file 21 is explained with reference to FIG. 6. In the online process, the page is input from the extended storage (ES2) 12 to the input/output buffer (BUFF1) 31 and the file 21 is referred. In the batch process, the updating is executed by using the extended storage ( ES1) 11. When the page which is not present in the extended storage (ES1) 11 is to be updated, the page is input from the extended storage (ES2) 12 to the input/output buffer (BUFF2) 32 and after the updating, it is output to the extended storage (ES1) 11. When the batch process is completed, the access from the online process is switched from the extended storage (ES2) 12 to the extended storage (ES1) 11 and the extended storage (ES2) 12 is used for the next batch process. By alternately using the areas of the two extended storage, the updated record reload process can be attained by mere logical exchange of the areas of the extended storage.

Figure 14:
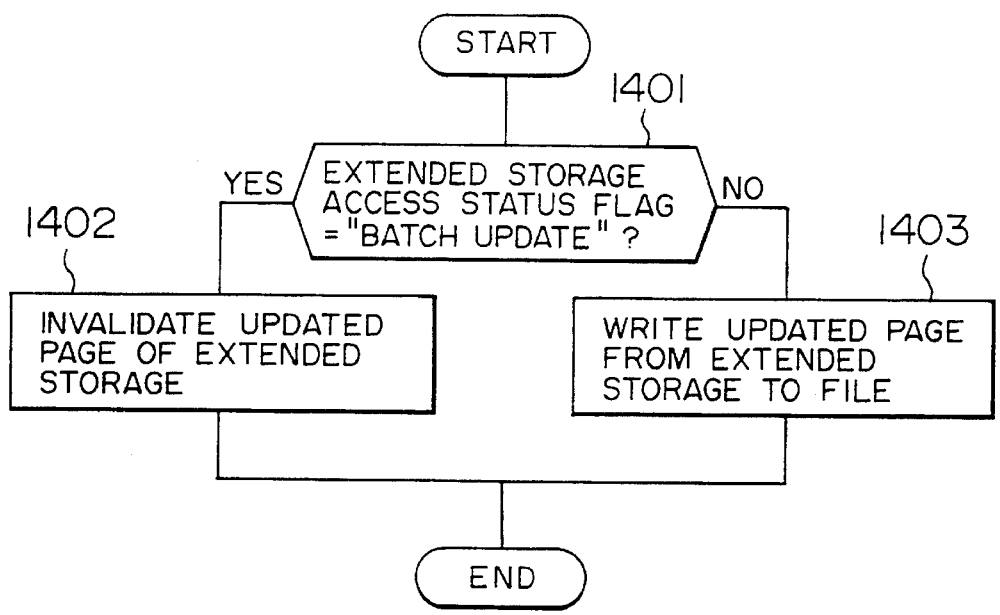
FIG. 14 shows a flow chart of a fault recovery process in an embodiment of the present invention.

An operation of the fault recovery process is now explained with reference to FIG. 14. When a fault occurs, whether or not the extended storage (ES1) 11 was being updated is determined based on the extended storage access status flag information of the file management table (1401). If the batch process is updating the extended storage (ES1) 11, the updated content of the extended storage (ES1) 11 is invalidated (1402) to make the content of the file to that prior to the execution of the batch process. When the updated page reload process is updating the file 21, the updated page reload process is reexecuted to reload the updated page from the extended storage (ES1) 11 to the file 21 to make the status of the file 21 to that prior to the execution of the batch process.

Figure 22:
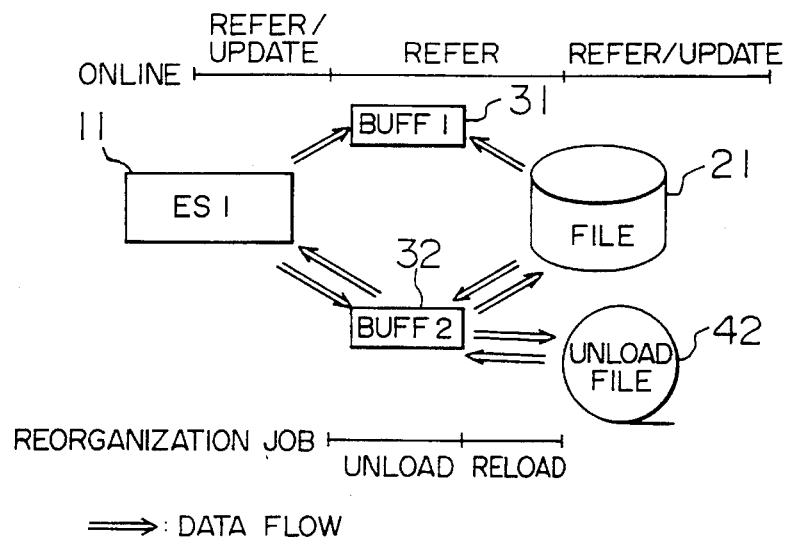
FIG. 22 shows a flow chart of data in a file reorganization method in an embodiment of the present invention.

FIG. 22 shows a data flow in the file reorganization (in which disordered arrangement of record is reorganized) of the present embodiment. In the file reorganization process, a reload process of the record to an unload file (which temporarily store the record) is added to the data flow of the batch process.

The extended storage is fixed as the area for the file reorganization, the records are rearranged and the records are reloaded to the unload file.

Figure 23:
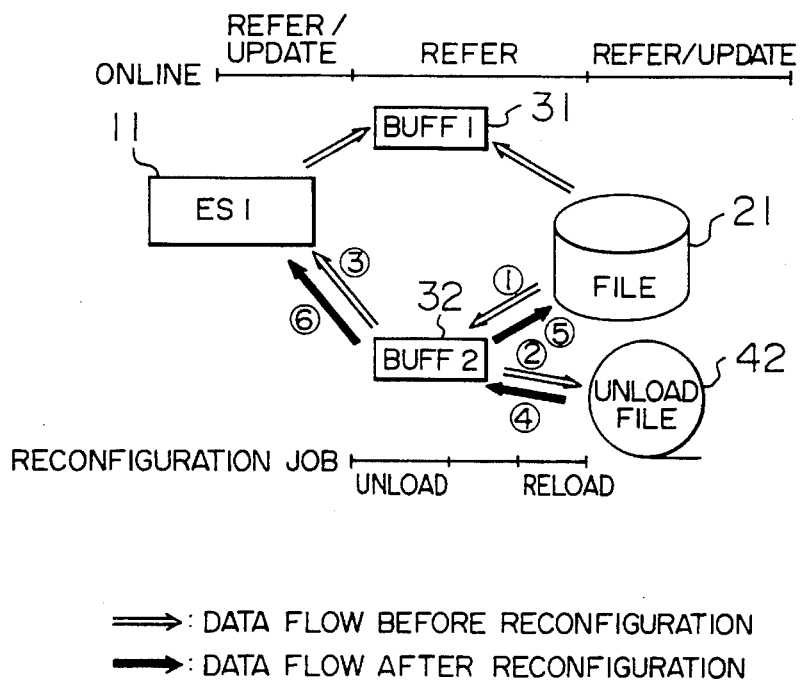
FIG. 23 shows a flow chart of data in a file reconfiguration method in an embodiment of the present invention.

FIG. 23 shows a data flow in the file reconfiguration method (in which the configuration elements such as file size and record length are changed) of the present embodiment. In the file reconfiguration, the reloading of the record to the unload file and a phase to reconfigure the file are added to the data flow of the batch process.

Figure 21:
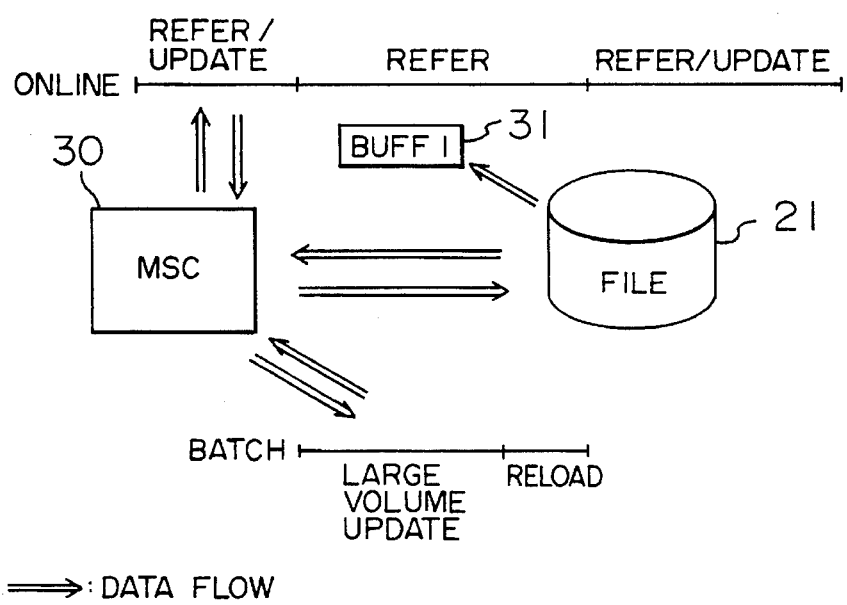
FIG. 21 shows a flow chart of data when a main storage is used in place of the extended storage in an embodiment of the present invention.

Instead of the extended storage (ES1) 11 and the file 21 of the above embodiment, a stand-alone extended storage which is a storage device shared by a plurality of data processing units as shown in FIG. 18 may be used. A main storage as shown in FIG. 21 may be used to attain the same operation.

In accordance with the present invention, there is no contention of resources between the online process and the batch process and the high speed batch process is attained while the online process is executed without affecting to the online process. Further, the backup of the file in preparation for the abnormal ending of the process for updating, adding or deleting a large volume of data is eliminated.

What is claimed is:

1. A file updating method in a file management system having a processor, a file storage device, an extended storage for storing at least a partial copy of the file, a data input/output buffer and a batch processing buffer, each of said buffers being connected between said file storage device and said extended storage, said batch processing buffer and said extended storage making reference to and updating records of the file uploaded from said file storage device in an online process, said method comprising the steps of:

(a) temporarily disconnecting the extended storage from said data input/Output buffer during the online process;

(b) executing a reference process by said extended storage via said batch processing buffer in parallel with the online process to the file of the file storage device and executing updating of file records resulting from said reference process in the batch process by using said extended storage; and (c) collectively reloading the updated records on the extended storage to the file of the file storage device via said batch processing buffer after the completion of the batch process.

2. A file updating method according to claim 1, further comprising the step of connecting or disconnecting the extended storage from or to the online process in response to a command to switch the extended storage from or to the online process issued to the file management system.

3. A file updating method according to claim 1, further comprising the steps of determining whether the process to be executed by the file management system is the batch process or the online process and disconnecting or reconnecting the extended storage from or to the online process in accordance with the above determination.

4. A file updating method according to claim 1, further comprising the step of dynamically allocating or disallocating the extended storage to a file not used by the extended storage in the online process, for the batch process.

5. A file updating method according to claim 1, further comprising the step of dynamically allocating or disallocating a predetermined area of the extended storage to a batch process for dedicated use by said batch process, without disconnecting the extended storage from the online process, for a file used by the extended storage in the online process.

6. A file updating method according to claim 1, further wherein said file storage device and said extended storage include a stand-alone extended storage which is a storage device shared by a plurality of data processing units.

7. A file updating method according to the claim 1) further comprising the steps of detecting the disorder of the storage of the records in the file by the repetitive and random storage of the records, allocating a part of the extended storage as an area for reorganizing the records in response to the detection of the disorder, executing the rearrangement of the records and reloading the rearranged records to an unload file.

8. A file updating method according to claim 1, further comprising the steps of allocating a predetermined area of the extended storage as an area for reconfiguring a file in response to a request for reconfiguring the file, reconfiguring the file, and reloading the records of the reconfigured file to an unload file after the completion of the file reconfiguration.

9. A file updating method according to claim 1, further comprising the steps of recovering the content of the record based on the file in the storage device when a fault occurs during the updating of the file in said extended storage, and recovering the content of the record based on the extended storage in response to the occurrence of the failure during the updating of the file.

10. A file updating method according to claim 1, wherein the reference of a large volume of files and the backup of the files are executed instead of the batch process for updating the records.

11. A file updating method according to claim 1, wherein an extended storage is provided as the file storage device and the extended storage for the online process and the extended storage for the batch process are exchanged instead of reloading the updated record to the file of the file storage device upon completion of the batch process.

12. A file management system having a processor, a file storage device storing a file, an extended storage for storing at least a partial copy of the file, and file update means for executing a reference process to and updating a record of the file uploaded from said file storage device in an online process, said file update means comprising:

first means operated by said processor for temporarily disconnecting the extended storage from the online process during the online process;

second means responsive to the operation of said first means for executing a reference process by said extended storage in a batch process in parallel in the online process to the file of the file storage device and executing updating of records stored in said extended storage resulting from said reference process in a batch process; and third means responsive to completion of the execution of said second means for collectively reloading the records Updated in said extended storage to the file of said file storage device after the completion of the batch process.

13. The file update means according to claim 12, further comprising means for connecting or disconnecting the extended storage from or to the online process in response to a command to switch the extended storage from or to the online process issued to the file management system.

14. The file update means according to claim 12, further comprising means for determining whether the process to be executed by the file management system is the batch process or the online process and means responsive to said determining means for disconnecting or reconnecting the extended storage from or to the online process in accordance with the determination by said determining means.

15. The file update means according to claim 12, further comprising means for dynamically allocating or disallocating the extended storage to a file not used by the extended storage in the online process, for the batch process.

16. The file update means according to claim 12, further comprising means for dynamically allocating or disallocating a predetermined area of the extended storage to a batch process for dedicated use by said batch process, without disconnecting the extended storage from the online process for a file used by the extended storage in the online process.

17. The file updating means according to claim 12, wherein said file storage device and said extended storage include a stand-alone extended storage which is a storage device shared by a plurality of data processing units.

18. The file update means according to claim 12, further comprising means for detecting the disorder of the storage of the records in the file by the repetitive random storage of the records, allocating a part of the extended storage as an area for reorganizing the records in response to the detection of the disorder, executing the rearrangement of the records and reloading the rearranged records to an unload file.

19. The file update means according to claim 12, further comprising means for allocating a predetermined area of the extended storage as an area for reconfiguring a file in response to a request for reconfiguring the file, reconfiguring the file, and reloading the records of the reconfigured file to an unload file after the completion of the file reconfiguration.

20. The file update means according to claim 12, further comprising means for recovering the content of the record based on the file in the storage device when a fault occurs during the updating of the file of the extended storage, and recovering the content of the record based on the extended storage in response to the occurrence of the failure during the updating of the file.

21. The file update means according to claim 12, wherein the reference of a large volume of files and the backup of files are executed instead of batch process for updating the records.

22. The file update means according to claim 12, wherein an extended storage is provided as the file storage device and the extended storage for the online process and the extended storage for the batch process are exchanged instead of reloading of the updated record to the file of the file storage device upon completion of the batch process.

* * * * *